United States Patent Office 2,807,080
Patented Sept. 24, 1957

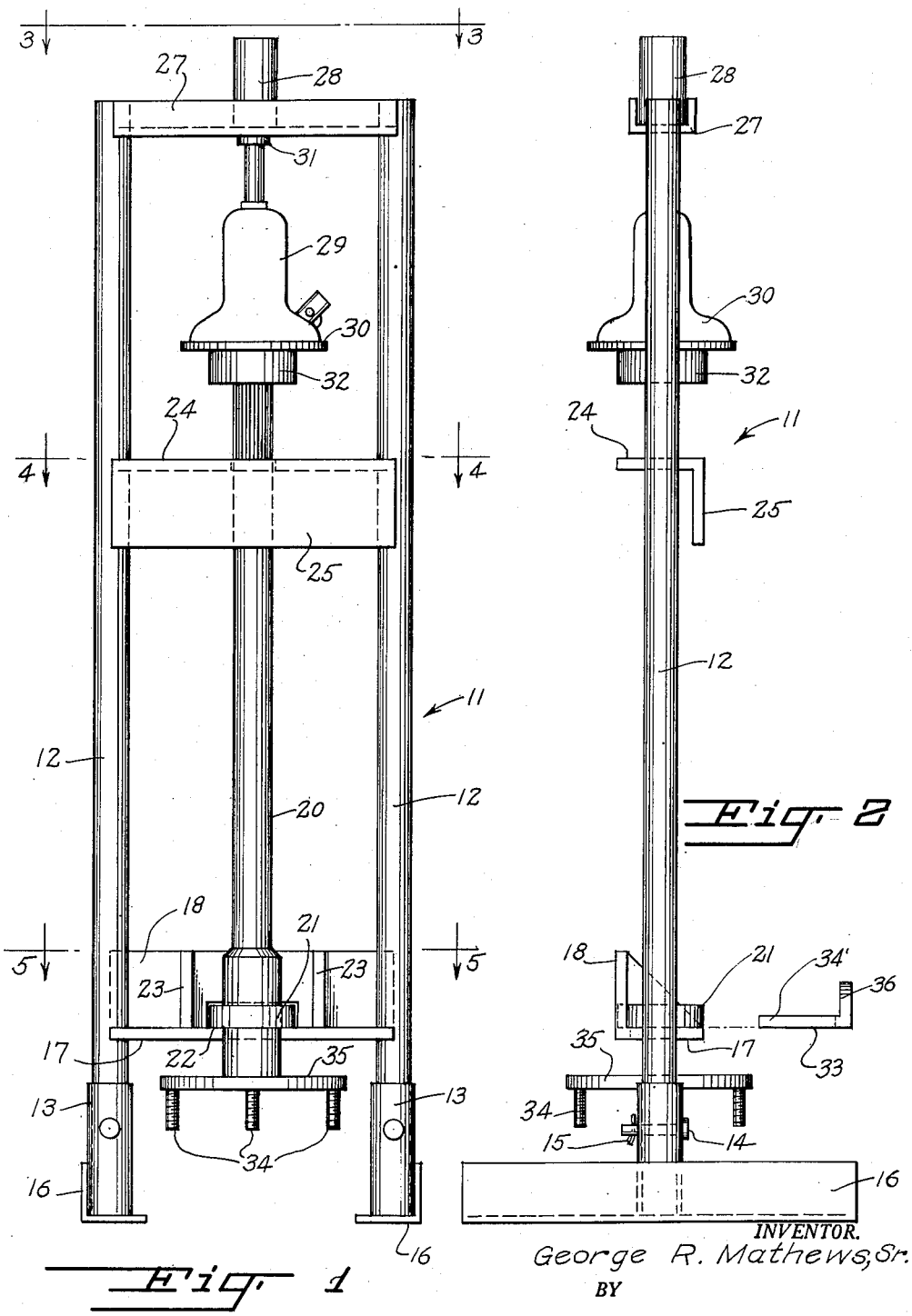

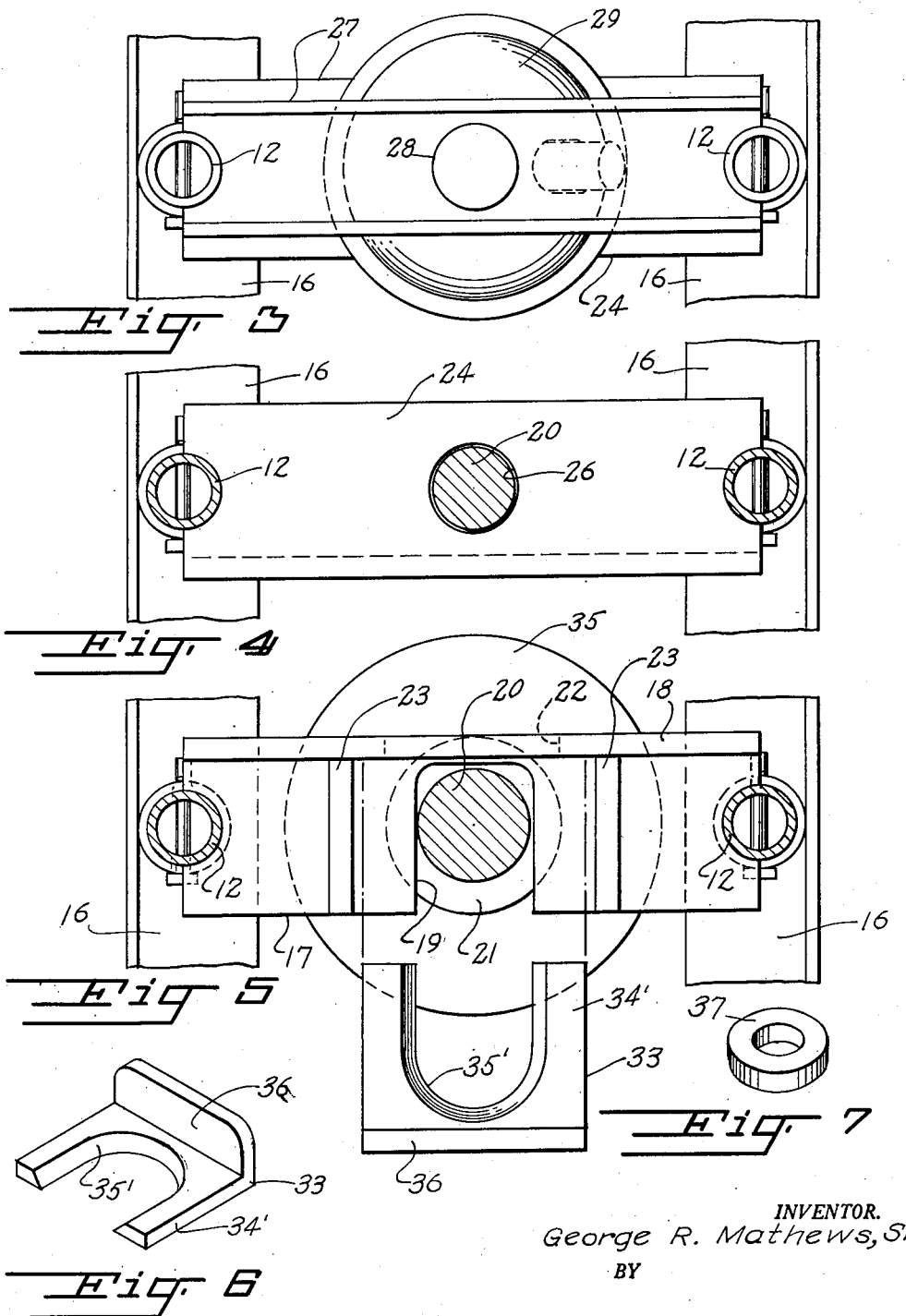

2,807,080
BEARING PULLER
George R. Mathews, Sr., Houston, Tex.
Application June 1, 1955, Serial No. 512,395
2 Claims. (Cl. 29—251)

This invention relates to devices for removing bearings from vehicle axles and for mounting bearings on such axles, and more particularly to an improved bearing puller and bearing replacing implement of the type employing a jack therein to provide the required force.

A main object of the invention is to provide a novel and improved device for removing bearings from vehicle axles and for mounting bearings on such axles, said device being simple in construction, being easy to operate, and providing a great saving in time and labor in the removal of bearings from vehicle axles and for the replacement of such bearings on the axles.

A further object of the invention is to provide an improved device for removing bearings from vehicle axles and for replacing such bearings, said device involving inexpensive components, being durable in construction, being adjustable for use with a wide range of sizes of vehicle axles and bearings, and being easy to manipulate.

Further objects and advantages of the invention will become apparent from the following description and claims, and from the accompanying drawings, wherein:

Figure 1 is a front elevational view of an improved device according to the present invention, shown employed for removing a bearing from a vehicle axle.

Figure 2 is a side elevational view of the device of Figure 1.

Figure 3 is an enlarged top view of the device taken on the line 3—3 of Figure 1.

Figure 4 is an enlarged horizontal cross sectional view taken on the line 4—4 of Figure 1.

Figure 5 is an enlarged horizontal cross sectional view taken on the line 5—5 of Figure 1.

Figure 6 is a perspective view of a shim member which may be employed beneath the bearing in the device of Figures 1 to 5 to provide a proper seat for the bearing while it is being pulled off the axle.

Figure 7 is a perspective view of a guide ring employed on the axle when a bearing is being replaced thereon by the device of Figures 1 to 5.

Referring to the drawings, the improved bearing puller and replacer is designated generally at 11 and comprises a pair of parallel tubular bar members 12, 12 of substantial length whose lower ends are secured in respective sleeves 13, 13 by suitable fastening pins 14 extending through the sleeves 13 and the lower portions of bars 12 received therein, as is clearly shown in Figure 2, the pins 14 being retained in fastening positions by cotter pins 15, as illustrated.

Each sleeve 13 is centrally secured in perpendicular relationship to a respective angle bar 16, whereby the angle bars 16, 16 define a supporting base for the frame of the implement to support the implement in an upstanding position.

Designated at 17 is a first horizontal cross member which rigidly connects the lower portions of the tubular bars 12, 12, said cross member comprising an angle bar having the upstanding flange 18 spaced a short distance outwardly from the plane of the frame bars 12, 12.

As shown in Figure 5, the horizontal flange of the angle bar 17 is formed at its central portion with a generally rectangular notch 19 adapted to receive a portion of a vehicle axle 20 subjacent to the bearing 21 thereof with the bearing 21 resting on the horizontal flange of the cross member 17, the vertical flange 18 of said cross member being formed with a slot 22 adjacent to the horizontal flange of the cross member 17 with its longitudinal edges extending parallel to said flange, said slot being shaped to receive a peripheral portion of the bearing 21 and to aid in maintaining the bearing 21 stationary while it is being pulled from the vehicle axle 20.

The angle bar 17 is rigidified at the opposite sides of notch 19 and slot 22 by respective triangular brace plates 23, 23 welded in the angle bar, as clearly shown in Figures 1 and 5.

Designated at 24 is a second cross member which rigidly connects the upper portions of the bar members 12, 12, said second cross member being in the form of an angle bar having a depending flange 25 located on the side of the bar members 12, 12 opposite to the vertical upstanding flange 18 of the angle bar 17.

As shown in Figures 1 and 2, the second cross member 24 is spaced a substantial distance from the first cross member 17. The horizontal flange of the second cross member 24 is provided with a central aperture 26 aligned with the notch 19 of the first cross member 17 and being shaped to receive the upper portion of the vehicle axle 20 when the implement is arranged in the position shown in Figures 1 and 2.

Designated at 27 is a third cross member which rigidly connects the top ends of the bar members 12, 12, said third cross member 27 comprising a channel bar having centrally secured thereto the upstanding striking head element 28 which is aligned with the aperture 26 and the notch 19.

Designated at 29 is a jack of generally conventional construction provided with the usual base 30 and the usual extensible upper element 31. Rigidly secured to the bottom surface of the base 30 is a cylindrical block 32 which is dimensioned so as to be receivable between the flange bolts 34 at the end of a conventional axle 20 against the flange 35 of said conventional axle when a bearing is being replaced on the axle, as will be presently described, whereby the flange 35 and the bolts 34 are protected against damage.

In using the implement to remove a bearing 21 from an axle 20, the upper end portion of the axle is inserted through the opening 26 and the portion of the axle adjacent the flange 35 is engaged in the notch 19 with the bearing received in the slot 22, as shown in Figure 1. The jack 29 is then engaged between the top end of the axle 20 and the central portion of the top cross member 27, the extensible portion 31 of the jack being engaged subjacent to the striking head member 28 and the block element 32 of the jack being engaged against the top end of the axle 20. The jack is then actuated to apply a downward force against the axle 20 which acts to remove the bearing 21 from the axle, since the bearing 21 is supported on the cross member 17. The loosening of the bearing 21 is further achieved by striking the impact element 28 with any heavy object, such as a hammer or the like, the vibrations thus produced being transmitted through the jack to the axle 20 and assisting in the loosening of the bearing 21 and then the disengagement of the bearing from the axle.

A suitable shim 33 may be employed between the bearing 21 and the horizontal flange of the cross member 17 to provide a proper seat for the bearing when the downward force is being applied to the axle 20 by jack 29. The shim member 33 comprises a main body 34' having a U-shaped notch 35' therein dimensioned to fit closely around the portion of the axle carrying the bearing 21 so as to provide a proper seat for the bearing when it is being loosened by the downward force applied to the axle. The shim member 33 is provided with an upstanding end flange 36, serving as a handle and also serving as a stop element engageable against the bearing so that the shim element will be properly positioned beneath the bearing.

In replacing a bearing on the axle, the new bearing is first engaged on the axle and a guide ring 37 is engaged on the axle adjacent the new bearing. The axle is then inserted downwardly through the aperture 26 with its end portion engaged through the notch 19, the flange element 35 of the axle then being uppermost. The jack 29 is then positioned with its cylindrical block element 32 disposed against the flange 35 and received between the bolts 34 with its extensible upper end portion 31 engaged subjacent the central portion of the top cross member 27. The jack is then actuated to exert downward force on the flange member 35, said downward force being thus transmitted to the axle. The bearing is supported on the upper cross member 24, and thus the downward force applied to the axle causes the bearing to be forced onto the axle. The guide ring 37 assures proper seating of the bearing on the upper cross member 24 when the force is being applied to the axle by means of jack 29.

For purposes of transportation or storage, the bar members 12 may be unfastened from the sleeves 13 so that the base members 16, 16 may be removed. To detach the bar members from the sleeves 13, 13, it is merely necessary to remove the cotter pins 15 and pull out the pins 14.

While a specific embodiment of an improved device for removing bearings from vehicle axles and for mounting bearings on such axles has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a device for removing bearings from vehicle axles and for mounting bearings on such axles, a pair of parallel bar members, a first cross member connecting the bar members, said cross member having a first flange extending transverse to and perpendicular to said bar members and having a second flange extending parallel to said bar members, said first flange being formed with a notch to receive a portion of an axle adjacent the bearing to be removed, said second flange being formed with a slot adjacent to said first flange and having its longitudinal edges extending parallel to said first flange to receive a portion of the bearing to be removed, a second cross member connecting the bar members at a point spaced from the first cross member and being formed with an aperture aligned with said notch to receive another portion of the axle, a third cross member connecting the bar members at a point spaced still further from the first cross member and being spaced from the second cross member, and a jack disposed between said third cross member and said second cross member and being adapted to engage the end of an axle extending through the aperture of said second cross member.

2. In a device for removing bearings from vehicle axles and for mounting bearings on such axles, a pair of parallel bar members, a first cross member connecting the bar members, said cross member having a first flange extending transverse to and perpendicular to said bar members and having a second flange extending parallel to said bar members, said first flange being formed with a notch to receive a portion of an axle adjacent the bearing to be removed, said second flange being formed with a slot adjacent to said first flange and having its longitudinal edges extending parallel to said first flange to receive a portion of the bearing to be removed, a second cross member connecting the bar members at a point spaced from the first cross member and being formed with an aperture aligned with said notch to receive another portion of the axle, a third cross member connecting the bar members at a point spaced still further from the first cross member, and being spaced from the second cross member, a striking head element secured to said third cross member in alignment with said aperture and said notch, and a jack disposed between said striking head element and said second cross member and being adapted to engage the end of an axle extending through the aperture of said second cross member.

References Cited in the file of this patent

UNITED STATES PATENTS

| | | |
|---|---|---|
| 1,201,162 | Eames | Oct. 10, 1916 |
| 2,085,529 | Heimback | June 29, 1937 |
| 2,566,847 | Miller | Sept. 4, 1951 |
| 2,708,305 | Ohl | May 17, 1955 |